United States Patent
Kong et al.

(10) Patent No.: US 12,019,983 B1
(45) Date of Patent: Jun. 25, 2024

(54) DATASET GENERATION FROM A KNOWLEDGE GRAPH USING A CUSTOM ONTOLOGY

(71) Applicant: Amazon Technologies, Inc., Seattle, WA (US)

(72) Inventors: Luyang Kong, Seattle, WA (US); Christoper Winestock, Seattle, WA (US); Parminder Bhatia, Seattle, WA (US); Meng Xiao Wang, Seattle, WA (US); Siddhi Pathak, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 17/360,890

(22) Filed: Jun. 28, 2021

(51) Int. Cl.
| | |
|---|---|
| G06F 40/247 | (2020.01) |
| G06F 16/36 | (2019.01) |
| G06F 16/901 | (2019.01) |
| G06N 5/02 | (2023.01) |
| G06N 5/022 | (2023.01) |

(52) U.S. Cl.
CPC .......... *G06F 40/247* (2020.01); *G06F 16/367* (2019.01); *G06F 16/9024* (2019.01); *G06N 5/02* (2013.01); *G06N 5/022* (2013.01)

(58) Field of Classification Search
CPC ...... G06N 5/02; G06N 5/022; G06F 16/9024; G06F 40/247; G06F 16/367
See application file for complete search history.

(56) References Cited

U.S. PATENT DOCUMENTS

| | | | | |
|---|---|---|---|---|
| 2017/0337262 | A1* | 11/2017 | Smith | G06F 16/36 |
| 2020/0012733 | A1* | 1/2020 | Ding | G06F 16/2264 |
| 2021/0358601 | A1* | 11/2021 | Pillai | G16H 40/20 |
| 2022/0100847 | A1 | 3/2022 | Wegman et al. | |
| 2022/0207343 | A1 | 6/2022 | Lei et al. | |
| 2022/0246253 | A1 | 8/2022 | Lawrence et al. | |

OTHER PUBLICATIONS

Wang et al. ("A study of entity-linking methods for normalizing Chinese diagnosis and procedure terms to ICD codes." Journal of biomedical informatics 105 (2020): 103418 (Year: 2020).*
Agarwal et al. ("Snomed2Vec: Random Walk and Poincare Embeddings of a Clinical Knowledge Base for Healthcare Analytics." arXiv preprint arXiv:1907.08650 (2019)) (Year: 2019).*
Malik et al., "Automated domain-specific healthcare knowledge graph curation framework: Subarachnoid hemorrhage as phenotype." Expert Systems with Applications 145 (2020): 113120 (Year: 2020).*

(Continued)

*Primary Examiner* — Samuel G Neway
(74) *Attorney, Agent, or Firm* — Nicholson De Vos Webster & Elliott LLP

(57) ABSTRACT

Techniques for generating a dataset from a knowledge graph are described. An exemplary method includes receiving a request to generate a dataset from a knowledge graph to be stored in the storage; generating a dataset comprising a plurality of mention-concept pairs from the knowledge graph according to the request based one or more of a synonym-based and graph-based evaluation of the knowledge graph and a custom ontology for the knowledge graph; and storing the generated dataset in the storage.

20 Claims, 12 Drawing Sheets

(56) References Cited

OTHER PUBLICATIONS

Non-final office action, U.S. Appl. No. 17/360,876, Sep. 25, 2023, 18 pages.
Advisory Action, U.S. Appl. No. 17/360,876, Mar. 15, 2024, 3 pages.
Final Office Action, U.S. Appl. No. 17/360,876, Dec. 21, 2023, 25 pages.

* cited by examiner

```
{
  "ENTITIES": [
    {
      "ATTRIBUTES": [
        {
          "BEGINOFFSET": NUMBER,
          "ENDOFFSET": NUMBER,
          "ID": NUMBER,
          "RELATIONSHIPSCORE": NUMBER,
          "SCORE": NUMBER,
          "TEXT": "STRING",
          "TRAITS": [
            {
              "NAME": "STRING",
              "SCORE": NUMBER
            }
          ],
          "TYPE": "STRING"
        }
      ],
      "BEGINOFFSET": NUMBER,
      "CATEGORY": "STRING",
      "ENDOFFSET": NUMBER,
      "ICD10CMCONCEPTS": [
        {
          "CODE": "STRING",
          "DESCRIPTION": "STRING",
          "SCORE": NUMBER
        }
      ],
      "ID": NUMBER,
      "SCORE": NUMBER,
      "TEXT": "STRING",
      "TRAITS": [
        {
          "NAME": "STRING",
          "SCORE": NUMBER
        }
      ],
      "TYPE": "STRING"
    }
  ],
  "MODELVERSION": "STRING",
  "PAGINATIONTOKEN": "STRING"
}
```

*FIG. 2*

```
{
  "ENTITIES": [
    {
      "ID": 1,
      "TEXT": "ABDOMINAL PAIN",
      "CATEGORY": "MEDICAL_CONDITION",
      "TYPE": "DX_NAME",
      "SCORE": 0.9606665968894958,
      "BEGINOFFSET": 153,
      "ENDOFFSET": 167,
      "ATTRIBUTES": [
        {
          "TYPE": "ACUITY",
          "SCORE": 0.7643427252769947,
          "RELATIONSHIPSCORE": 0.9999940395355225,
          "ID": 2,
          "BEGINOFFSET": 183,
          "ENDOFFSET": 193,
          "TEXT": "PERSISTENT",
          "TRAITS": []
        }
      ],
      "TRAITS": [
        {
          "NAME": "SYMPTOM",
          "SCORE": 0.7559975981712341
        }
      ],
      "ICD10CMCONCEPTS": [
        {
          "DESCRIPTION": "UNSPECIFIED ABDOMINAL PAIN",
          "CODE": "R10.9",
          "SCORE": 0.7775180339813232
        },
        {
          "DESCRIPTION": "EPIGASTRIC PAIN",
          "CODE": "R10.13",
          "SCORE": 0.6876822710037231
        },
        {
          "DESCRIPTION": "LOWER ABDOMINAL PAIN, UNSPECIFIED",
          "CODE": "R10.30",
          "SCORE": 0.6758853197097778
        },
        {
          "DESCRIPTION": "GENERALIZED ABDOMINAL PAIN",
          "CODE": "R10.84",
          "SCORE": 0.6746202707290649
        },
        {
          "DESCRIPTION": "UPPER ABDOMINAL PAIN, UNSPECIFIED",
          "CODE": "R10.10",
          "SCORE": 0.6702126860618591
        }
      ]
    }
  ...
  "MODELVERSION": "0.1.0"
}
```

*FIG. 3*

```
{
    "ID": 3,
    "TEXT": "NAUSEA",
    "CATEGORY": "MEDICAL_CONDITION",
    "TYPE": "DX_NAME",
    "SCORE": 0.9962648749351501,
    "BEGINOFFSET": 210,
    "ENDOFFSET": 216,
    "ATTRIBUTES": [],
    "TRAITS": [
      {
        "NAME": "SYMPTOM",
        "SCORE": 0.9296342730522156
      },
      {
        "NAME": "NEGATION",
        "SCORE": 0.9620923399925232
      }
    ],
    "ICD10CMCONCEPTS": [
      {
        "DESCRIPTION": "NAUSEA WITH VOMITING, UNSPECIFIED",
        "CODE": "R11.2",
        "SCORE": 0.8000147938728333
      },
      {
        "DESCRIPTION": "NAUSEA",
        "CODE": "R11.0",
        "SCORE": 0.7653312683105469
      }
}
```

*FIG. 4*

DATASET GENERATION FROM A KNOWLEDGE GRAPH USING A CUSTOM ONTOLOGY

BACKGROUND

As the amount of data generated and utilized in modern computing continues to expand, a relatively new problem has arisen regarding how to effectively manage and utilize the sheer volume of data. As one example, many organizations have large amounts of unstructured alphanumeric data including textual notes or summaries. While such data is easily utilized and understood by human readers, it is incredibly difficult if not impossible for computing applications to be able to use data in this format, which may be disorganized or organized according to different people's preferences, include different word spellings or acronyms across different users, include varying amounts of detail, etc.

For example, business intelligence type applications are typically designed to provide specific analytics, and thus require a specific data schema or arrangement of data to operate upon. Thus, these applications are not able to utilize the various types of data provided by unstructured data, as unstructured data cannot provide any explicit data structure and instead may or may not provide dimensions or identification attributes, such as tags or metadata that may describe the unstructured data. Further, in the rare case that some business's unstructured data conforms to an explicit structure, it typically will not be compatible with existing business applications. As unstructured data typically does not provide a schema or other data descriptor that may be interpreted by current applications, these applications will fail to extract any base data on which analytics can be run. Finally, as unstructured data is often in different formats and structures even within a same service area, market, type and/or content current applications are thus unable to make assumptions about data. As a result, attempts to automate the use of current business intelligence systems on various unstructured data sources have failed.

Some methods have been developed to attempt to bring unstructured data into existing business intelligence type applications, such as via manual tagging. However, manually tagging unstructured data by human taggers to provide a well-defined structure is completely impractical in most systems having large amounts of data, and furthermore manual processes typically produce significant numbers of errors. Thus, manual tagging fails to scale as the amount of unstructured data grows, resulting in a significant number of errors being introduced into the data. Further, although some attempts have been made to create automated tagging software, these systems similarly tend to introduce many errors and typically only work for specific use cases.

BRIEF DESCRIPTION OF DRAWINGS

Various embodiments in accordance with the present disclosure will be described with reference to the drawings, in which:

FIG. 2 illustrates embodiments of a response template from the medical condition service.

FIG. 3 illustrates an example of a result of an InferICD10CM request.

FIG. 4 illustrates an example of a negation with respect to an entity.

DETAILED DESCRIPTION

Figure 1:
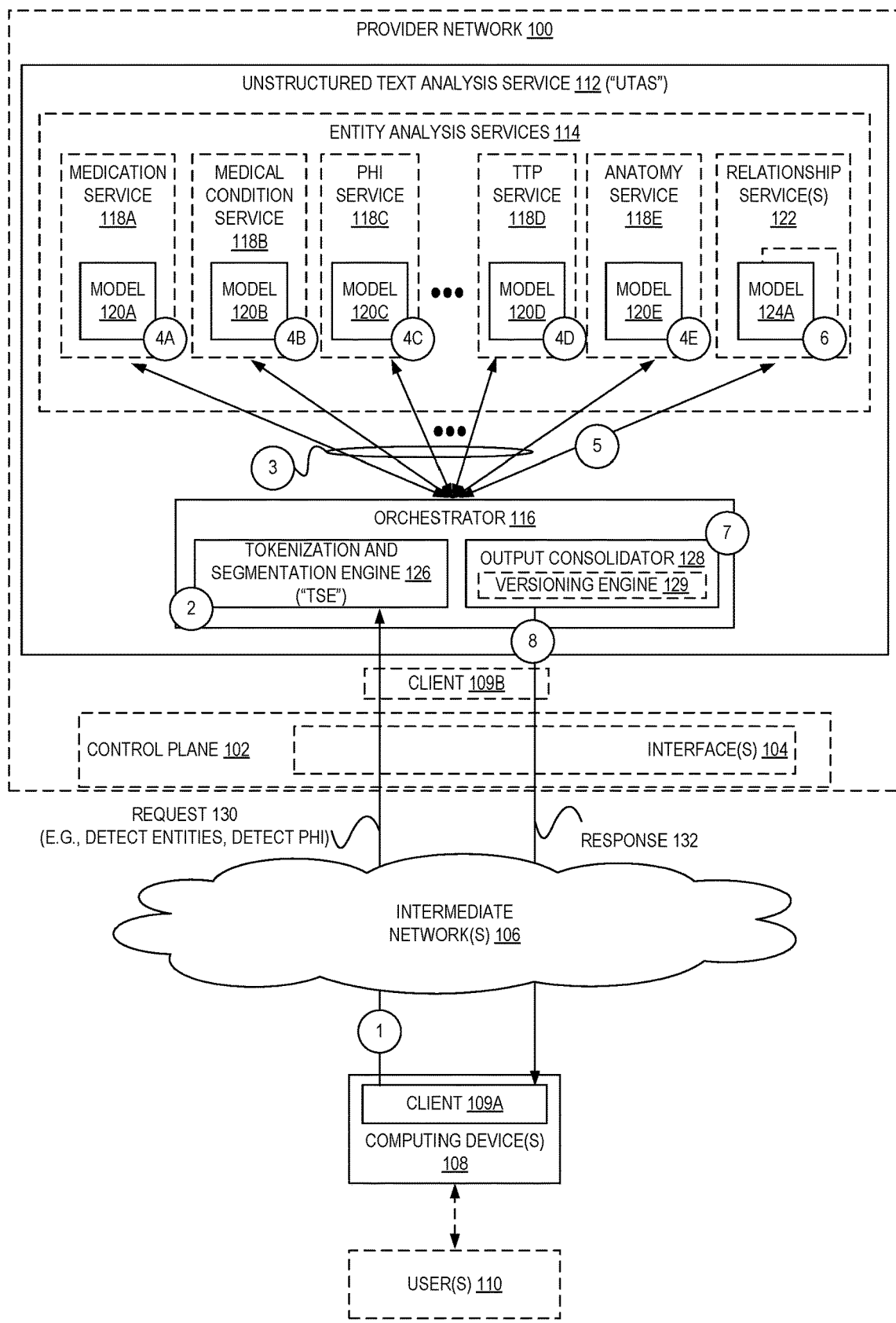
FIG. 1 is a diagram illustrating an environment for synchronous entity and relationship detection from unstructured text according to some embodiments.

The present disclosure relates to methods, apparatus, systems, and non-transitory computer-readable storage media for medical entity retrieval from rich knowledge graphs. As indicated above, many organizations have large amounts of useful data stored in plaintext formats, which makes it extremely difficult to use at large scale in programmatic ways—e.g., for performing analytics. This challenge is particularly relevant in the medical field, in which there exists huge amounts of medical information—ranging from textual descriptions of symptoms, patient history, treatment plans, etc. —represented in data within plaintext fields. There remains a very strong interest in analyzing this extensive medical information to advance the field, whether for detecting optimal treatment patterns, identifying shared but unknown causes of ailments, eliminating administrative burdens, and for countless other possibilities. For example, if various notes regarding clinical trials are made in plaintext form, and a researcher seeks to identify patients who had a particular disease and took a particular medication, typically the researcher (and/or assisting workers) must examine the doctors' notes one by one and/or use search tools in complex ways, such as via crafting queries broadly enough to cover alternative spellings, abbreviations, etc., for the terms of interest, and trying to craft complex but flexible queries to search for different types of information in close proximity with other types of information, e.g., "daily" and "aspirin" and "heart attack" or "stroke" and "male" and "age 70" within some "close" amount of proximity to each other. However, this remains exceedingly difficult—for medical or administrative workers without advanced experience in information retrieval, and even for those well-versed in the field—due to the huge amount of data involved and lack of standardization in the formats of data present in these fields.

Accordingly, embodiments described herein provide a service that can be utilized in a simple and straightforward manner by clients to automatically identify entities—such as types of medications, treatments, medical conditions, etc. —and optionally, relationships involving these entities with other detected classes of objects such as attributes or traits—from unstructured text.

As used herein, unstructured data (or unstructured information) may refer to information that either does not have a pre-defined data model or is not organized in a pre-defined manner. Thus, the term unstructured text may refer to alphanumeric type unstructured data such as one or more sentences, one or more sentence fragments, one or more paragraphs, etc. Such unstructured text is often generated or originated by humans, e.g., doctors or nurses may write notes regarding a patient, etc.

Entity retrieval is the task of linking mentions of named entities (found in text) to concepts in a curated knowledge graph (KG). This allows medical researchers and clinicians to search medical literature easily using standardized codes and terms to improve patient care. Training an effective entity retrieval system often requires high quality annotations, which are expensive and slow to produce in the medical domain. It is therefore not feasible to annotate enough data to cover the millions of concepts in a medical KG, and difficult to adapt quickly enough to those newly appeared medical conditions and drug treatments under a public health crisis. Hence, a robust medical entity retrieval system is expected to have decent performance in a zero-shot scenario.

Zero-shot retrieval is challenging due to the complexity of medical corpora large numbers of ambiguous terms, copious acronyms and synonymous terms. It is difficult to build an accurate similarity measure which can detect the true relatedness between a mention and a concept even when their surface forms differ greatly.

Early entity retrieval systems used string matching methods such as exact match, approximate match and weighted keyword match. Although annotated training data is not required, such systems typically lack the ability to handle synonyms and paraphrases with large surface form differences. In recent years, large scale pretraining has been widely adopted in the medical domain such as Clinical BERT and BioBERT. Most of them, however, require a finetuning step on annotated training data before being applied to entity retrieval.

As an alternative to manually annotating a corpus, the rich semantics inside a KG itself can be utilized. One important entry is the synonym, whereby two medical terms may be used interchangeably. In addition, the graphical structure of a KG contains information on how concepts are related to each other and so can be used as another valuable resource for building an effective similarity measure. Embodiments herein utilize synonym-based tasks and/or graph-based tasks to mine a medical KG. Trained with our proposed tasks, a simple Siamese architecture significantly outperforms common zero-shot benchmarks across multiple major medical ontologies including Unified Medical Language System (UMLS), Systematized Nomenclature of Medicine—Clinical Terms (SNOMED) and International Classification of Diseases, Tenth Revision (ICD-10).

For further detail, FIG. 1 is a diagram illustrating an environment for synchronous entity and relationship detection from unstructured text according to some embodiments. In this exemplary environment, an unstructured text analysis service 112 (or "UTAS") includes an orchestrator 116 that receives requests 130 to detect entities within unstructured text and implements a "scatter" approach to processing utilizing multiple ML models 120/124 (of a set of one or more entity analysis services 114) trained to detect particular entities and/or relationships between types of detected objects. The outputs of these models can be used to generate a consolidated result provided as a response 132 to the request 130 that identifies the various entities and optionally relationships between the entities and other detected objects from within the provided unstructured text.

In some embodiments, the UTAS 112 can operate to detect useful medical-related information in unstructured text such as clinical text. As much as 75% of all health record data is found in unstructured text, e.g., in physician's notes, discharge summaries, test results, case notes, and so on, the UTAS 112 can utilize uses Natural Language Processing (NLP) models to sort through this enormous quantity of data and retrieve valuable information that is otherwise difficult to retrieve and use without significant manual effort.

Although the UTAS 112 may not be a substitute for professional medical advice, diagnosis, or treatment, the UTAS 112 can provide confidence scores that indicate the level of confidence in the accuracy of the detected entities, which can be used to enable client systems to apply more (or less) scrutiny to its results based on the particular use case. For example, in certain use cases a client may cause the results generated by the UTAS 112 to be reviewed and verified by appropriately trained human reviewers, though in other use cases such review and verification may be unnecessary or may be only needed for those results exhibiting less than some threshold amount of accuracy based on the confidence scores.

Components of the UTAS 112 may be implemented as software executed by one or more computing devices, as hardware, or as a combination of both hardware and software. As one example, the UTAS 112 may include an orchestrator 116 implemented as software executed by a first one or more computing devices and may further include one or more models 120/124 implemented as software by the first one or more computing devices or a second one or more computing devices.

In some embodiments, the UTAS 112 is implemented as a service within a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, the UTAS 112 described herein, etc. Users 110 (or "customers") of provider networks 100 may utilize one or more user accounts that are associated with a customer account, though these terms may be used somewhat interchangeably depending upon the context of use. Users may utilize a computing device 108 to interact with a provider network 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

For example, in various embodiments, a "serverless" function may include code provided by a user or other entity that can be executed on demand. Serverless functions may be maintained within provider network 100 and may be associated with a particular user or account or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. In some embodiments, one or more or all of the components of the UTAS 112 may be implemented as serverless functions, e.g., the orchestrator 116, tokenization and segmentation engine 126 ("TSE"), output consolidator 128, ML models 120/124, etc.

As indicated herein, a user 110 may utilize the UTAS 112 to detect entities within medical unstructured text. Thus, the user may utilize a client 109A implemented by a computing device 108 outside the provider network 100 (e.g., as part of a medical application installed on a personal computer or server computing device, as part of a web-based console provided by the provider network 100) or a client 109B implemented by a computing device within the provider network 100 (e.g., as part of an application executed in the provider network 100, such as by a hardware virtualization service, "serverless" on-demand code execution service, etc.) to issue requests 130 at circle (1) to the UTAS 112.

These clients 109 may use the UTAS 112 for a variety of purposes. As one example, a client 109 may be part of an application allowing doctors and health care providers to manage their unstructured notes effectively and rapidly assess medical information about their patients that doesn't easily fit into the forms traditionally used. Analyzing case notes, for instance, may help providers identify candidates for early screening for certain medical conditions before the condition becomes more difficult to treat. It may also allow patients to report their health concerns in a narrative that can provide more information in a simple format, and then make those narratives easily available to providers in a more structured form, allowing more accurate diagnosis of medical conditions.

As another example, a client 109 may operate as part of a clinical research application allowing life sciences or research organizations to optimize the matching process for fitting patients into clinical trials using information from unstructured clinical texts, such as case notes and test results. For instance, for a clinical trial of a new heart medicine, use of the UTAS 112 makes it much simpler to analyze text to find specific information about heart failure patients. The client 109 may also be part of an application to improve pharmacovigilance and post-market surveillance to monitor adverse drug events by using UTAS 112 to detect pertinent information in clinical text that is otherwise difficult to access. Moreover, the client 109 may use the UTAS 112 to assess therapeutic effectiveness by easily detecting vital information in follow-up notes and other clinical texts. For example, it can be easier and more effective to monitor how patients respond to certain therapies by analyzing their narratives.

As yet another example, a client 109 may be part of a medical records application, e.g., a medical billing system payor can use the UTAS 112 to expand its analytics to include the use of unstructured documents such as clinical notes, where more information about a diagnosis as it relates to billing codes can be determined.

The request 130 (and response 132) sent by clients 109 can utilize encrypted connections (e.g., using HTTPS over TLS), and the UTAS 112 in some embodiments does not persistently store any user/client content. Accordingly, the UTAS 112 may qualify as a HIPAA eligible service without requiring users to configure encryption-at-rest within the service.

In some embodiments, the request 130 may be one or either of a "Detect Entities" (or, "DetectEntities") request or a "Detect PHI" (or, "DetectPHI") request. A DetectEntities request may be used to indicate a client's request for the UTAS 112 to examine unstructured clinical text to detect textual references to valuable medical information related to various "entities" such as medical condition, treatment, tests and test results, medication (possibly including dosage, frequency, method of administration, etc.), treatment, Protected Health Information (PHI) data, and so on. In contrast, a DetectPHI request may be used to indicate a client's request for the UTAS 112 to detect references to only one entity—e.g., PHI data such as names, addresses, ages, etc. In other embodiments, other types of requests may be straightforwardly implemented by one of skill in the art based on this provided description to involve more, fewer, and/or different types of entities.

For the sake of illustration, we assume the request 130 sent at circle (1) is a DetectEntities request, instructing the UTAS 112 to inspect provided clinical text for a variety of medical entities and return specific information about any detected entities such as each entity's category, location, and confidence score on that information. In some embodiments, the request 130 includes an amount of unstructured text—e.g., up to 20,000 bytes of characters in some format (e.g., UTF-8).

The request 130 can be provided to an orchestrator 116 implementing a "front end" of the service. The orchestrator 116 in some embodiments is implemented by a fleet of multiple compute instances, where each compute instance may implement one or both of a TSE 126 and an output consolidator 128. Thus, in some embodiments, the requests 130 may be load balanced between multiple such orchestrator 116 instances (or TSE 126 instances).

Upon receipt of each request by the orchestrator 116, the request 130 (or elements thereof, such as the text) may be provided to a TSE 126 at circle (2). Each TSE 126 may split the text into one or more segments, which may be based on applying a set of rules that indicate where the text is to be split. For example, the segmentation may include splitting the text based on the existence of newline characters, periods, and/or other delimiters, to yield a set of one or more segments.

In some embodiments, the TSE 126 then tokenizes the segments to identify one or more "tokens" within each segment. A token may be a word or a grouping of characters, and the tokenization may be performed by applying another set of rules that indicate where the segment is to be split. For example, the tokenization may include identifying the existence of spaces, tabs, column delimiters (such as pipes or colons), etc., to thus identify the beginning and end of a token. Thus, the TSE 126 may generate token metadata indicating a beginning location and an ending location of a token (within a segment) or a character length. Thus, for an example segment "Infuse Sodium Chloride 0.9% solution", a token of "Infuse" may be identified via a beginning offset of "0" and an ending offset of "6," or via a beginning offset of "0" and a length of "6." Likewise, a token of "0.9%" (as one example way of tokenizing including the "%" character) may be identified via a beginning offset of "23" and an ending offset of "28," or via a beginning offset of "23" and a length of "5."

In some embodiments, each identified segment of text and metadata identifying the tokens therein is provided, by the orchestrator 116, to multiple ML models 120A-120E according to a "scatter" type technique as reflected by circle (3). Each of the ML models 120A-120E may be trained to detect a particular entity type from within unstructured text, and in some cases, ones of the models 120 may be executed in parallel for a same segment or group of segments. In this example, the orchestrator 116 is shown as utilizing five models 120A-120E, though in other embodiments more or fewer models (e.g., via more or fewer services 118A-118E) may be used.

As illustrated, each ML model 120 may be implemented as part of a service (or "micro-service") that receives inference requests, optionally pre-processes the input data, provides the provided input (or pre-processed input) to an ML model trained to identify a particular type of entity, optionally post-processes the output inference result, and returns the (optionally post-processed) inference result to the client—here, the orchestrator 116. In this example system, a first model 120A may be part of a medication service 118A that identifies medications and/or dosage information at (4A), a second model 120B may be part of a medical condition service 118B that identifies symptoms and diagnosis of medical conditions at (4B), a third model 120C may be part of a PHI service 118C that detects a patient's personal information (e.g., address, age, email address, personal identifier, name, phone number, profession, etc.) at (4C), a fourth model 120D may be part of a Test and Treatment Procedure (TTP) service 118D that detects procedures used to determine a medical condition at (4D), and a fifth model 120E that may be part of an anatomy service 118E that detects references to the parts of the body or body systems and the locations of those parts or systems at (4E).

In some embodiments, one or more of the ML models 120 are trained using annotated training data, e.g., doctors' notes that have been annotated by humans and/or automated processes (e.g., active learning techniques) and the like, to cause the ML models 120 to be able to detect particular entity types. The ML models 120 may be based on a variety of ML algorithms known to those of skill in the art, such as a neural network (e.g., a Long short-term memory (LSTM) neural network or other type of Recurrent Neural Network (RNN)). The training may be performed via use of an ML service and may include the use of hyperparameter tuning techniques to create a highly accurate model. The resulting trained models, in some embodiments, are hosted by an ML service, which can deploy these models as services.

In some embodiments, the UTAS 112— via use of these ML models—may detect information in multiples classes (or "object types"), such as entities, categories, types, attributes, traits, etc. An entity generally refers to a textual reference to the name of relevant objects, such as people, treatments, medications, or medical conditions for example, "Ibuprofen" may be an entity. A category generally refers to a generalized grouping to which a detected entity belongs, for example, "Ibuprofen" may be part of a MEDICATION category, where a category may be associated with a particular model 120 and thus entities of that category may be detected by that model. A type generally refers to a type of the entity detected, scoped to a category. For example, "Ibuprofen" is in the GENERIC NAME type in the MEDICATION category. An attribute generally refers to information related to a detected entity, such as a dosage of a medication for example, "200 mg" is an attribute of an "Ibuprofen" entity. A trait generally refers to something that the UTAS 112 understands about an entity, based on context. For example, a medication may have a "NEGATION" trait if it determined that a patient is not taking it.

In some embodiments, the medical condition service 118B, via use of model 120B, infers symptoms and diagnosis of medical conditions from text using a KG. In some embodiments, this detection is made in response to an API or other call. For example, in some embodiments, when the KG is ICD-10-CM, an InferICD10CM request including text is received by the entity analysis services 114, and in particular, is handled by the medical condition service 118B using a model 120B. This information may be returned to the orchestrator 116 in a variety of formats.

FIG. 2 illustrates embodiments of a response template from the medical condition service. This response template provides collection of medical entities extracted from the input text and their associated information. For each entity, the response provides the entity text, the entity category, where the entity text begins and ends, a concept, and the level of confidence in the detection and analysis. Attributes and traits of the entity are also returned.

The detected attributes that relate to the entity are provided. An extracted segment of the text that is an attribute of an entity, or otherwise related to an entity, such as the nature of a medical condition. In some embodiments, the detected attributes are provided in an array of attribute objects. Each object includes one or more of: a beginOffset which is a character offset in the input text that shows where the attribute begins; an EndOffset which is a character offset in the input text that shows where the attribute ends; an Id that is a numeric identifier for this attribute (within the response); a RelationshipScore which is a level of confidence that this attribute is correctly related to this entity; a score which is a level of confidence that the segment of text is correctly recognized as an attribute; text which is the segment of input text which contains the detected attribute; traits which are contextual information for the attribute; and a type (e.g., DX_NAME having a value such as acuity, direction, system organ site, quality, and quantity).

In some embodiments, traits are provided as an array of trait objects. These objects have a name or contextual description about the trait (e.g., negation, diagnosis, sign, symptom) and a score that is a level of confidence that the segment of text is correctly recognized as a trait.

The BeginOffset for the entity is a character offset in the input text that shows where the entity begins. The category of the entity is a medical condition. The EndOffset is a character offset in the input text that shows where the entity ends.

The ICD-10-CM concepts that the entity could refer to, along with a score indicating the likelihood of the match are also provided. In some embodiments, these concepts are provided as an array of concept objects. These concept objects include the ICD-10-CM code that identifies the concept in the KG, a description of the ICD-10-CM code in the ontology, and a score that is a level of confidence that the entity is accurately linked to an ICD-10-CM concept.

An identifier for the entity is provided. The Score is a level of confidence in the accuracy of the detection. The text portion is a segment of input text that is matched to the detected entity.

The provided traits for the entity provide contextual information for the entity. The traits recognized by InferICD10CM are DIAGNOSIS, SIGN, SYMPTOM, and NEGATION. Traits are typically provided as an array of trait objects (detailed above).

A Type section describes the specific type of entity with category of entities. InferICD10CM detects entities of the type DX_NAME.

FIG. 3 illustrates an example of a result of an InferICD10CM request. In particular, the text "The patient is a 71-year-old female patient of Dr. X. The patient presented to the emergency room last evening with approximately 7- to 8-day history of abdominal pain which has been persistent. She has had no nausea and vomiting, but has had persistent associated anorexia. She is passing flatus, but had some obstipation symptoms with the last bowel movement two days ago. She denies any bright red blood per rectum and no history of recent melena. Her last colonoscopy was approximately 5 years ago with Dr. Y. She has had no definite fevers or chills and no history of jaundice. The patient denies any significant recent weight loss." was included in the request.

As shown, the result included an entity for the text (mention) "abdominal pain" and that it was a symptom. There were 5 potentially related concepts included.

InferICD10CM also recognizes when an entity is negated in text. For instance, if a patient is not experiencing a symptom, both the symptom and negation are identified as traits and listed with a confidence score. Based on the input for the previous example, the symptom Nausea would be listed under NEGATION because the patient is not experiencing nausea. FIG. 4 illustrates an example of a negation with respect to an entity.

Similarly, in some embodiments, the PHI service 118C may, via use of model 120C, detect PHI-related entities. This may occur as part of a "general" request such as a DetectEntities API request, or may occur responsive to a DetectPHI API request that only solicits the detection of PHI entities. The PHI service 118C may detect a variety of different types of entities, including but not limited to an AGE type that represents components of age, spans of age, or other age mentioned in the unstructured text, a NAME type that represents names mentioned in the text, typically belonging to a patient, family, or provider, a PHONE_OR_FAX type that represents phone numbers or FAX numbers (and may eliminate certain named phone numbers, such as 1-800-QUIT-NOW or 911), an EMAIL type that represents email addresses, an ID type that represents a social security number, medical record number, facility identification number, clinical trial number, certificate or license number, vehicle or device number, or biometric number as it pertains to the patient, place of care, or provider, a URL type that represents a web URL, an ADDRESS type that represents geographical subdivisions of an address of any facility, named medical facilities, or wards within a facility, a PROFESSION type that represents a profession or employer mentioned in a note as it pertains to a patient or the patient's family.

By way of example, an unstructured text input may be "Patient is John Smith, a 48-year-old teacher and resident of Seattle, Washington" and the PHI service 118C may return that "John Smith" is an entity of type NAME, "48" is an entity of type AGE, "teacher" is an entity of type PROFESSION, "Seattle, Washington" is an ADDRESS entity.

In some embodiments, the anatomy service 118E may, via use of model 120E, detect references to the parts of the body or body systems and the locations of those parts or systems. The anatomy service 118E may be able to detect multiple (e.g., two) entity types, such as a DIRECTION entity, which is a directional term such as left, right medial, lateral, upper, lower, posterior, anterior, distal, proximal, contralateral, bilateral, ipsilateral, dorsal, ventral, and so on, and/or a SYSTEM ORGAN SITE entity, which is a body system, anatomic location or region, and/or body site. As an example, with unstructured text input of "Patient's left lung", the anatomy service 118E may identify "left" as an entity of DIRECTION type and "lung" as an entity of SYSTEM ORGAN SITE type.

In some embodiments, the medication service 118A may, via use of model 120A, detect medication and dosage information for a patient. The medication service 118A, in response to a request, may return information that may include some or all of two entity types, seven attributes, and one trait. One or more attributes can apply to an entity type. The entity types may include a BRAND NAME, which is a copyrighted brand name of the medication or therapeutic agent, or a GENERIC NAME, which is a non-brand name, ingredient name, or formula mixture of the medication or therapeutic agent. The attributes may include one or more of a DOSAGE attribute representing an amount of medication ordered, a DURATION attribute representing how long the medication should be administered, a FORM attribute representing a form of the medication, a FREQUENCY attribute representing how often to administer the medication, a RATE attribute representing an administration rate of the medication (e.g., for medication infusions or IVs), a ROUTE OR MODE attribute representing the administration method of a medication, a STRENGTH attribute for medication infusions or IVs a medication strength, etc. One or more traits may also be detected, such as a NEGATION trait identifying whether there exists an indication that the patient is not taking a medication.

In some embodiments, upon receiving the detected information back from a service (e.g., the medication service 118A), the orchestrator 116 may send this information (optionally along with other information received from other models/services) with the segment at circle (5) to one or more relationship services 122 that utilize one or more relationship models 124A-124N to detect relationships between these entities (or other types of information) at circle (6). These relationship models may be, for example, neural networks such as Convolutional Neural Networks (CNNs) trained with labeled training data indicating relationships between entities and attributes, etc.

In some embodiments the orchestrator 116 sends results obtained from the medication service 118A to a relationship service 122 to cause the relationship service 122 to identify relationships between the detected information—e.g., which attributes belong to (or, are associated with) which entities. This relationship information can be used to generate more detailed results back for the requesting client, allow for more sophisticated exploration or searching of the data, etc. For example, by detecting that an attribute of "80 mg" and an attribute of "daily" is associated with an entity of "Aspirin" in the unstructured text "The patient has been daily taking 80 mg of Aspirin", a client or user may then be able to identify this record when searching for all people who take 80 mg of Aspirin daily, but not identify the record when searching for similar but different things, such as people who take 80 mg of Furosemide daily.

For example, continuing the example provided earlier regarding unstructured text of (or including) "Infuse Sodium Chloride 0.9% solution 1000 mL intravenously daily Rate 200 mL/hr for next 3 days" received in/with a DetectEntities request 130, this segment (along with token information) may be passed at circle (3) to multiple services 118 (e.g., services 118A-118N), and in this case the intermediate results returned from the medication service 118A may indicate that multiple entities (and/or attributes) were found with a threshold amount of confidence, and thus the orchestrator may send on those intermediate results with the segment to a relationship service 122 to identify which attributes correspond to which entities.

As another example of involving relationships, in some embodiments the orchestrator 116 sends results obtained from the TTP service 118D to a relationship service 122 to cause the relationship service 122 to identify relationships between the detected information—e.g., which attributes belong to (or, are associated with) which entities.

In some embodiments, the TTP service 118D may, via use of model 120D, detect the procedures used to determine a medical condition. The TTP service 118D may identify, for example, three entity types and two attribute types. One or more attributes can be related to an entity of the TEST_NAME type.

For example, in some embodiments the TTP service 118D can detect PROCEDURE_NAME type entities, which are interventions as a one-time action performed on the patient to treat a medical condition or to provide patient care, and/or TEST_NAME type entities, which are procedures performed on a patient for diagnostic, measurement, screening, or rating that might have a resulting value, which may include a procedure, process, evaluation, or rating to determine a diagnosis, to rule out or find a condition, or to scale or score a patient. The TTP service 118D may additionally or alternatively be able to detect TREATMENT_NAME type entities, which are interventions performed over a span of time for combating a disease or disorder, which can include groupings of medications, such as antivirals and vaccinations.

The TTP service 118D, in some embodiments, can detect attributes such as a TEST_VALUE attribute representing a result of a test (which may apply to the TEST_NAME entity type) and/or TEST_UNIT attribute representing the unit of measure that might accompany the value of the test (which may apply to the TEST_NAME entity type).

As an example, the unstructured text of "Abdominal ultrasound noted acute appendicitis, recommend appendectomy followed by several series of broad spectrum antibiotics" may be analyzed by the TTP service 118D to identify "Abdominal ultrasound" is a TEST_NAME type entity, "acute" is an ACUITY type entity, "appendicitis" is a DX_NAME type entity, that DIAGNOSIS is a trait of the "appendicitis" type entity, that "appendectomy" is a PROCEDURE_NAME type entity, and "broad spectrum antibiotics" is a TREATMENT_NAME type entity.

With the intermediate results obtained from each utilized service—e.g., results from services 118A-118E and service(s) 122 for a DetectEntities request 130, results from PHI service 118C for a DetectPHI request 130, etc. —an output consolidator 128 may operate upon these intermediate results at circle (7) to generate a single result (based on these intermediate results) that can be returned to the client 109 via a response 132 at circle (8).

For example, in some embodiments when the processing is successful, the response is sent back as a HTTP 200 response that carries JSON formatted data. This data may include a collection of the medical entities extracted from the input text and their associated information. For each entity, the response provides the entity text, the entity category, where the entity text begins and ends, and the level of confidence in the detection and analysis. Attributes and traits of the entity are also returned.

In some embodiments, the output consolidator 128 may include a versioning engine 129 that can be utilized to generate a model version token that may be included in the response 132. In some cases, especially when the versions of the models 120/124 may be occasionally or continually updated or changed over time, a model version token may be provided in a response that can be used to identify which versions of which models were utilized to generate the result. The model version token may be generated based on model version identifiers corresponding to software release versions of the models—e.g., a concatenation of model version numbers is generated and then encrypted, etc. In such an example, the client/user may be unable to decrypt or de-obfuscate the model version token, though it could be provided back to the operator of the UTAS 112 who is in possession of the token generation logic and/or key used to encrypt the model version numeric data (e.g., when 2-way encryption is used). Such a scheme enables, for example, the operator of the UTAS 112 to analyze some problematic or unexpected output generated by the UTAS 112 by, among other things, determining which exact versions of the involved model(s) were utilized to generate that result.

The ultimate response can be presented to a user, utilized by an application, persisted for later use, etc.

Figure 5:
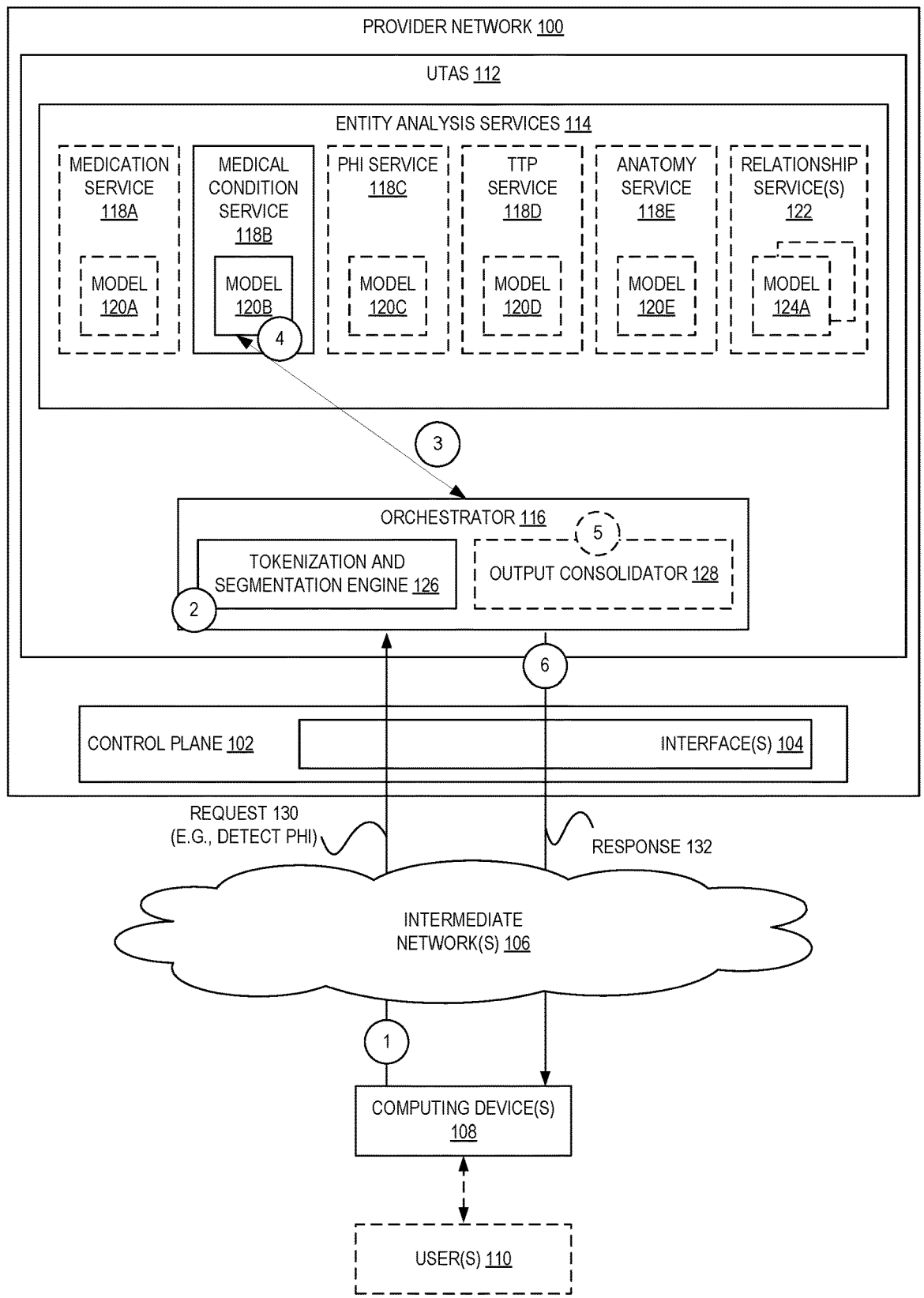
FIG. 5 is a diagram illustrating an environment for synchronous specified entity detection from unstructured text according to some embodiments.

FIG. 5 is a diagram illustrating an environment for synchronous specified entity detection from unstructured text according to some embodiments. As described herein, in some embodiments the orchestrator 116 of the UTAS 112 may utilize multiple ML models 120/124 to detect different types of entities in unstructured text. However, in some embodiments, the orchestrator 116 may also utilize just one service 118B or ML model 120B for this analysis. For example, in some embodiments a client 109A may issue a request 130 (e.g., an InferICD10CM request) at circle (1) to detect one particular type of entity using a KG. Again, the request can be segmented and tokenized at circle (2) as described herein, and at circle (3) the segments may be provided to one particular service—e.g., medical condition service 118B— to utilize an ML model 120C trained to detect entities of only that type at circle (4), and this information is returned to the orchestrator 116, which optionally could be directly returned within a response 132 at circle (6) or could be modified or consolidated in some manner at circle (5) before being sent in the response 132. In some cases where attributes may be involved, the orchestrator 116 may further utilize one or more relationship services 122 as described above to identify which attributes (or other aspects) correspond to which entities, and then this information returned by the relationship service(s) 122 may also be used by the output consolidator 128 at circle (5) to generate a result to be sent back in the response 132 at circle (6). Although this example involves single entity detect, it is to be understood that in other embodiments other services (or even combinations of services) and/or requests may be used to allow for different types or collections of types of entities to be detected.

As noted above, the model 120B utilizes a dataset derived from one or more KGs in making its inference in response to a request. In particular, the model 120B takes in text and finds relevant concepts derived from the one or more KGs. As such, for a given mention m (text) and a concept $c \in KG=\{c_1, c_2, \ldots c_n\}$, the goal of the model 120B is to infer a similarity measurement S(m, c) so that the most relevant concept for the mention is assigned the highest confidence score. Note that a concept is also referred to as a node in a KG in some embodiments. Note that in zero-shot entity retrieval there are some scenarios where only mentions are unseen and in other scenarios both mentions and concepts are unseen.

In some embodiments, the model 120B has a Siamese architecture. In this architecture, the mention m and concept c are first embedded into vectors, using a shared function T: $\vec{e_m}=T(m)$, $\vec{e_c}=T(c)$. T, in some embodiments, as an encoder such as a Transformer-based encoder. The similarity between a mention and a concept is then measured as the inner product $S(m, c) = \langle \vec{e_m}, \vec{e_c} \rangle$.

In some embodiments, the model 120B is optimized on a per parameter basis. For example, assume model parameter is θ. In-batch negatives are used for optimization of this parameter in some embodiments. Loss function for a batch of size B is defined as mean negative log likelihood $$L = -\frac{1}{B}\sum_{i=1}^{B} \log(P((m_i, c_i)|\theta))$$

where the conditional probability of each mention-concept pair $(m_i, c_i)$ in the batch is modeled as a softmax $$P((m_i, c_i)|\theta) = \frac{\exp(S_\theta(m_i, c_i))}{\sum_{j=1}^{B} \exp(S_\theta(m_j, c_j))}.$$

This log likelihood finds the loss for one mention and multiplies it by the sum of all mentions in a batch.

The model 120B may be trained to use one of more KGs. In particular, the learning tasks (training data) are constructed using mention-concept pairs (m, c) with a goal to capture multiple layers of semantics from a particular KG by leveraging its unique structure. Since each structure implies its own measure of similarity, learning tasks are designed to find very similar or closely related textual descriptions and use them to construct (m, c) pairs. There are two major types of tasks that may be used synonym-based tasks and graph-based tasks. These are illustrated below for three major medical KGs ICD-10, SNOMED and UMLS.

Figure 6:
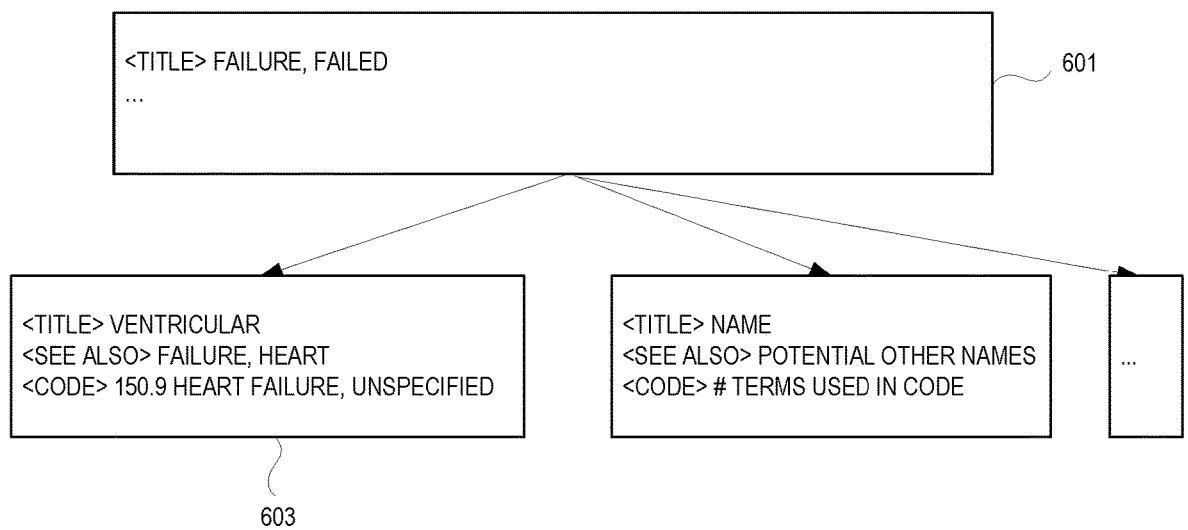
FIG. 6 illustrates exemplary embodiments of an ICD-10 tree structure.

The 10th version of the International Statistical Classification of Diseases, Clinical Modification (ICD-10) is one of the most widely used terminology systems for medical conditions. It contains over 69K concepts, organized in a tree structure of parent-child relationships. FIG. 6 illustrates exemplary embodiments of an ICD-10 tree structure. In ICD-10, a child node 603 is a more specific medical condition compared to its parent 601 (e.g., R07.9 Chest pain, unspecified is a child of R52 Pain, unspecified). Each node $N_i$ in the KG has at least three sections. A Title section contains a sub-specifier (e.g., Chest) of the title of the parent (e.g., Pain), therefore concatenation of the titles from the parent and child gives the full concept description (e.g., Chest Pain). This is denoted herein by $N_i^{TitleConcatenation}$. A Code section contains an ICD-10 code and its formal medical definition, denoted by $N_i^{CodeDescription}$. A SeeAlso section contains a similar concept, denoted by $N_i^{SeeAlso}$.

These three sections describe the same medical condition with different surface forms. As such, for an ICD-10 synonym-based task as the mentions and concepts are defined as $m=N_i^L$, $c=N_i^R$  $N_i^L$, $N_i^R \in \{N_i^{TitleConcatenation}, N_i^{CodeDescription}, N_i^{SeeAlso}\}$, $L \neq R$ With respect to FIG. 6, this provides for three pairs. A first has a mention of "Ventricular"+"Failure, failed" and a concept of "Heart failure, unspecified." A second has a mention of "Failure, heart" and a concept of "Heart failure, unspecified." A third has a mention of "Ventricular"+"Failure, failed" and a concept of "Failure, heart." These pairs are feed to the Siamese model during training and/or testing.

For a graph-based task of ICD-10, the semantics of parent-child relationships are incorporated into the learning. As such, an ICD-10 graph-based task is defined as $$m=N_i^{CodeDescription}, c=N_j^{CodeDescription}$$

where there must be a parent-child relationship $N_i \cdot is_{parent(N_j)}$ between a mention and concept.

Systematized Nomenclature of Medicine-Clinical Terms (SNOMED) is a standardized clinical terminology used for the electronic exchange of clinical health information with over 360K active concepts. Each node $N_i$ in SNOMED has multiple synonymous descriptions $\{l_i^1, l_i^2, \ldots, l_i^d\}$, with $l_i^1$ as the main description and the rest being synonyms. A SNOMED synonym-based task is defined as:

$$m=l_i^p, c=l_i^q, p > q$$

where $$\frac{d*(d-1)}{2}$$

unique (m, c) pairs are constructed at each node. In this instance d is the unique number of synonyms in the KG.

SNOMED is a directed graph with 107 possible relationship types (e.g., is_a, finding_site, relative_to). A direct connection between two nodes is likely to imply a certain degree of similarity, thus a SNOMED graph-based task may be defined as:

$$m=l_i^1, c=l_j^1$$

where there must be a connection $N_i \cdot is\_connected(N_j)$ between a mention and concept.

The Unified Medical Language System (UMLS) is a compendium of a large number of curated biomedical vocabularies with over 1MM concepts. UMLS has almost the same structure as SNOMED, therefore the synonym-based task and graph-based task may be defined a similar fashion to that of SNOMED.

In some embodiments, the (m, c) pairs generated at each node are combined and split into training and testing data. In some embodiments, there is a combined task where tasks are downsampled to equal sizes and then combined.

Figure 7:
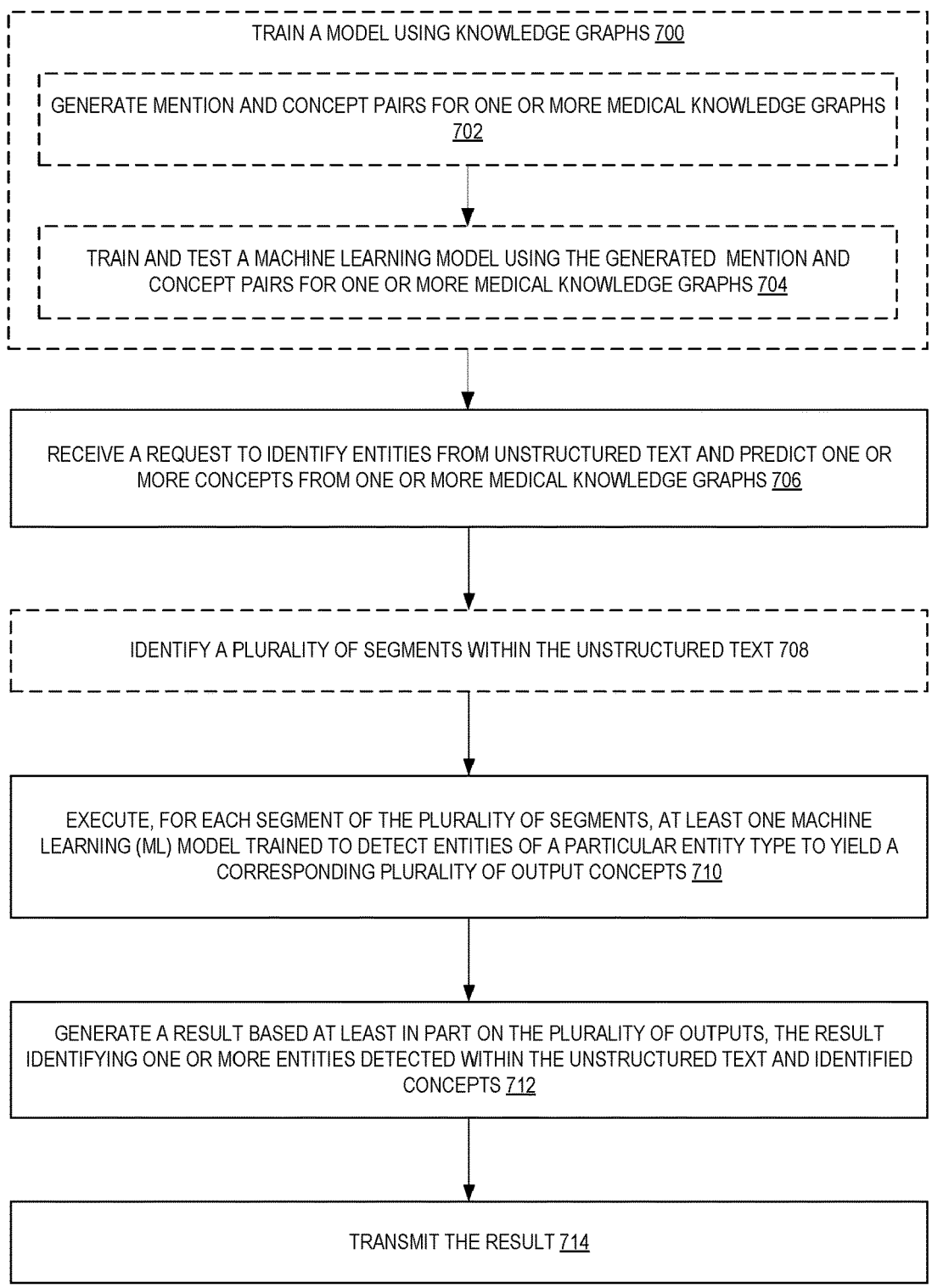
FIG. 7 is a flow diagram illustrating operations of a method for entity detection from unstructured text according to some embodiments.

FIG. 7 is a flow diagram illustrating operations of a method for entity detection from unstructured text according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the UTAS 112 depicted in the other figures.

In some embodiments, the operations include at 700, training at least one machine learning model using information from one or more (medical) knowledge graphs. For example, a machine learning model is trained on data from one or more of UMLS, ICD-10, and/or SNOMED to infer one or more concepts for one or more entities based on received text (mentions).

The training may include one or more sub-acts. In some embodiments, the training includes, at 702, the generation of mention and concept pairs for the medical knowledge graph from which a concept is to be inferred for a detected entity. Details of the generation of the generation of these pairs have been detailed above. At 704, the machine learning model is trained and tested using the generated mention and concept pairs for one or more medical knowledge graphs.

The operations include, at block 706, receiving a request to identify entities from unstructured text and predicting one or more concepts from one or more medical knowledge graphs. The request may be received at a web service endpoint of a provider network and may include an identifier of a particular KG to use. In some embodiments, the request includes unstructured text (e.g., alphanumeric data) itself. In some embodiments, the request includes an identifier of a storage location where the unstructured text may be obtained from. The request may include an identifier of a storage location where a result is to be stored.

In some embodiments, the plurality of entities includes one or more, two or more, three or more, etc., or all of: a medication; a medical condition; personal health information; a test, treatment, or procedure; or an anatomical body part or system. However, in other embodiments, other types of entities may be detected.

The operations further include, at block 708, identifying a plurality of segments (sometimes called spans) within the unstructured text. Block 710 may be performed based on applying one or more rules to the unstructured text to identify locations where the unstructured text is to be split. The one or more rules may specify one or more delimiters (e.g., a period character, a newline, etc.) that signify the end and/or beginning of a segment.

In some embodiments, the operations further include identifying tokens within the plurality of segments, which may be performed based on applying another one or more rules to the unstructured text (e.g., each of the segments) to identify locations of each token. The another one or more rules may specify one or more delimiters (e.g., a space character, a semicolon, a tab, etc.) that signify the end and/or beginning of a token.

The operations further include, at block 710, executing, for each segment of the plurality of segments, at least one ML model trained to detect entities of a particular entity type to yield a corresponding plurality of output concepts.

The operations further include, at block 712, generating a result based at least in part on the plurality of outputs, the result identifying one or more entities detected within the unstructured text and identified concepts. The result may include, for each of the entities, an identifier of the entity, a beginning and ending offset of the entity, a confidence score for the detection of the entity, the text of the entity, a category of the entity, any associated traits or attributes found within the unstructured text that are associated with the entity, etc.

In some embodiments, the operations further include, prior to block 712, executing, for each segment of the plurality of segments using at least the output from at least one of the plurality of ML models, another ML model trained to identify relationships between attributes and ones of the entities to yield another output, wherein the result is further based on the another output. For example, in some embodiments where one or more attributes are found that correspond to a detected entity, a block is included in the result for each of the one or more attributes that includes a type of the attribute, a confidence score in the detection of the attribute, a relationship score indicating a confidence in the association between the attribute and an associated entity, an identifier of the attribute, a beginning and ending offset of the attribute, the text of the attribute, any traits found to be associated with the attribute, etc. In some embodiments, the another ML model is a convolutional neural network (CNN) model.

In some embodiments, each of the plurality of ML models is executed by a separate one or more virtual machines or containers within a provider network. However, the plurality of ML models, in some embodiments, are implemented within a single container or a single virtual machine.

The operations further include, at block 714, transmitting the result (e.g., to a client that issued the request, to a storage location within or outside of a same provider network, etc.).

In some embodiments, the operations further include identifying, for each of the plurality of segments, one or more locations of one or more tokens within the corresponding segment, wherein for each segment each of the plurality of requests further includes identifiers of the one or more locations, and wherein each of the plurality of ML models detects entities using, as input to the ML model, the segment and the identifiers of the one or more locations.

In some embodiments, the operations further include obtaining a plurality of model version identifiers corresponding to software release versions of the plurality of ML models; and generating a model version token based on the plurality of model version identifiers, wherein the response further comprises the model version token.

The request, in some embodiments, was originated by a client and indicates that the result is to be generated and returned to the client synchronously via a same network connection; and the transmitting of the result occurs via the same network connection.

The request, in some embodiments, was originated by a client and identifies at least a storage location where the result is to be stored; and transmitting the result comprises sending the result to a storage service to be stored at the storage location.

Figure 8:
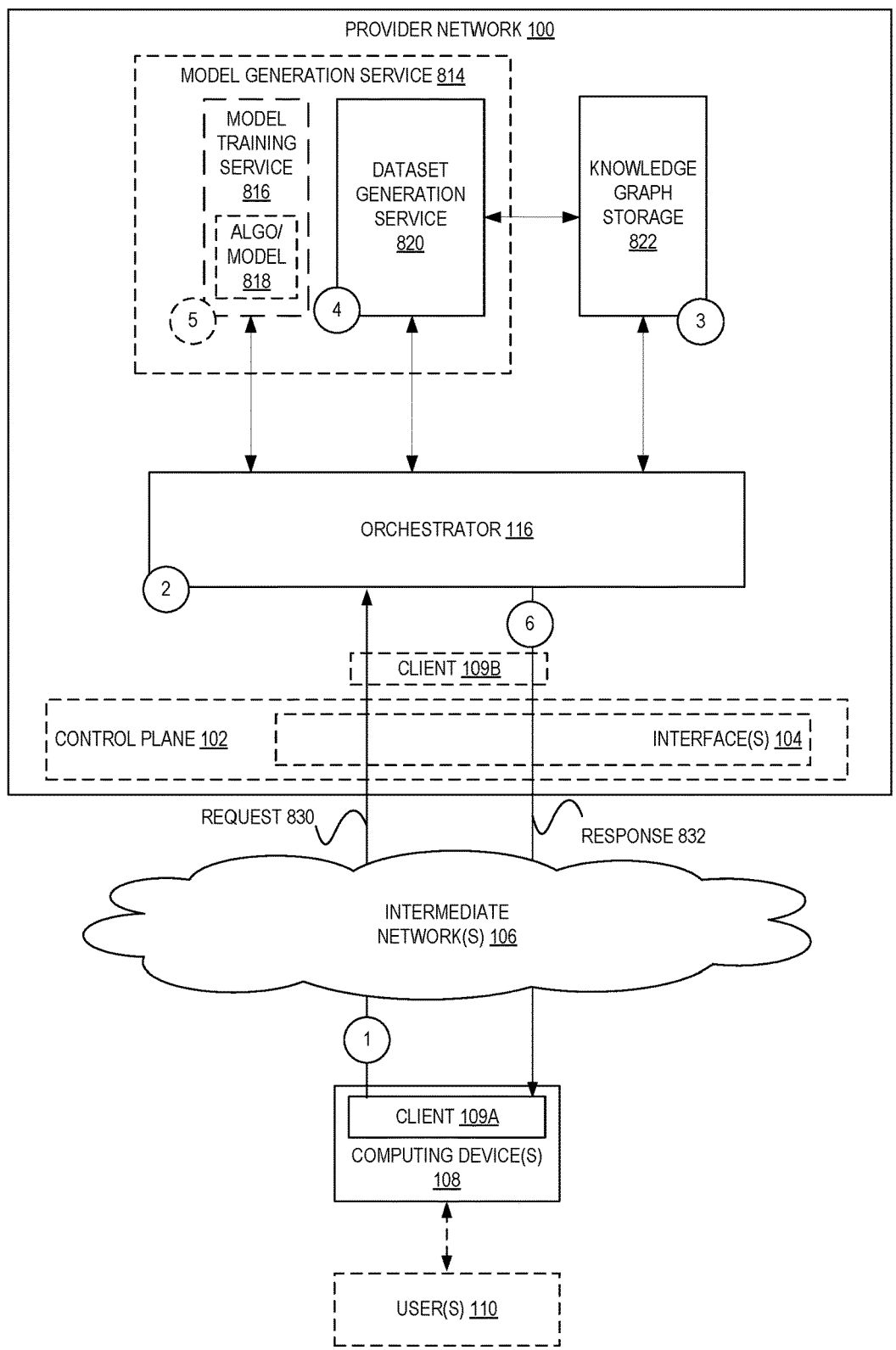
FIG. 8 illustrates embodiments of at least a dataset generation service of a provider network.

FIG. 8 illustrates embodiments of at least a dataset generation service of a provider network. Note that this illustration has components with identical numbers for earlier figures. These components provided the same, or similar, functionality. The dataset generation service 820 generates a training dataset from a knowledge graph stored in knowledge graph storage 822. The training dataset typically comprises mention-concept pairs. In some embodiments, the dataset generation service 820 also generates training and/or testing datasets from other types of data sources, however, those are not the focus of this discussion.

To generate a dataset (training and/or testing) from the knowledge graph, the dataset generation service 820 may perform one or more different types of acts in response to a request. In particular, in some embodiments, the generation service performs one or more of deriving a dataset from synonyms of nodes of the knowledge graph, deriving a dataset from connection relationships between of nodes of the knowledge graph, and/or deriving a dataset from parent-child relationships between of nodes of the knowledge graph. Examples of doing these acts for some exemplary medical KGs have been detailed above.

In some embodiments, the dataset generation service 820 is a part of a model generation service 814 which also includes a model training service 816. The model training service 816 utilizes the generated dataset to train an algorithm or fine-tune an existing model.

The circles with numbers indicate an exemplary flow. At circle 1, a request 830 is request 830 provided to an orchestrator 116 implementing a "front end" of the service to at least generate a dataset from a KG. The orchestrator 116 in some embodiments is implemented by a fleet of multiple compute instances.

Upon receipt of each request by the orchestrator 116 at circle 2, the request 830 (or elements thereof, such as the text) is provided to dataset generation service 820 and a knowledge graph is retrieved at circle 3.

At circle 4, the dataset generation service 820 generates a dataset according to the request using the retrieved KG. At circle 5, the model training service 816 trains a model. At circle 6, the requester is alerted of the completion of the model training and/or dataset generation.

Figure 9:
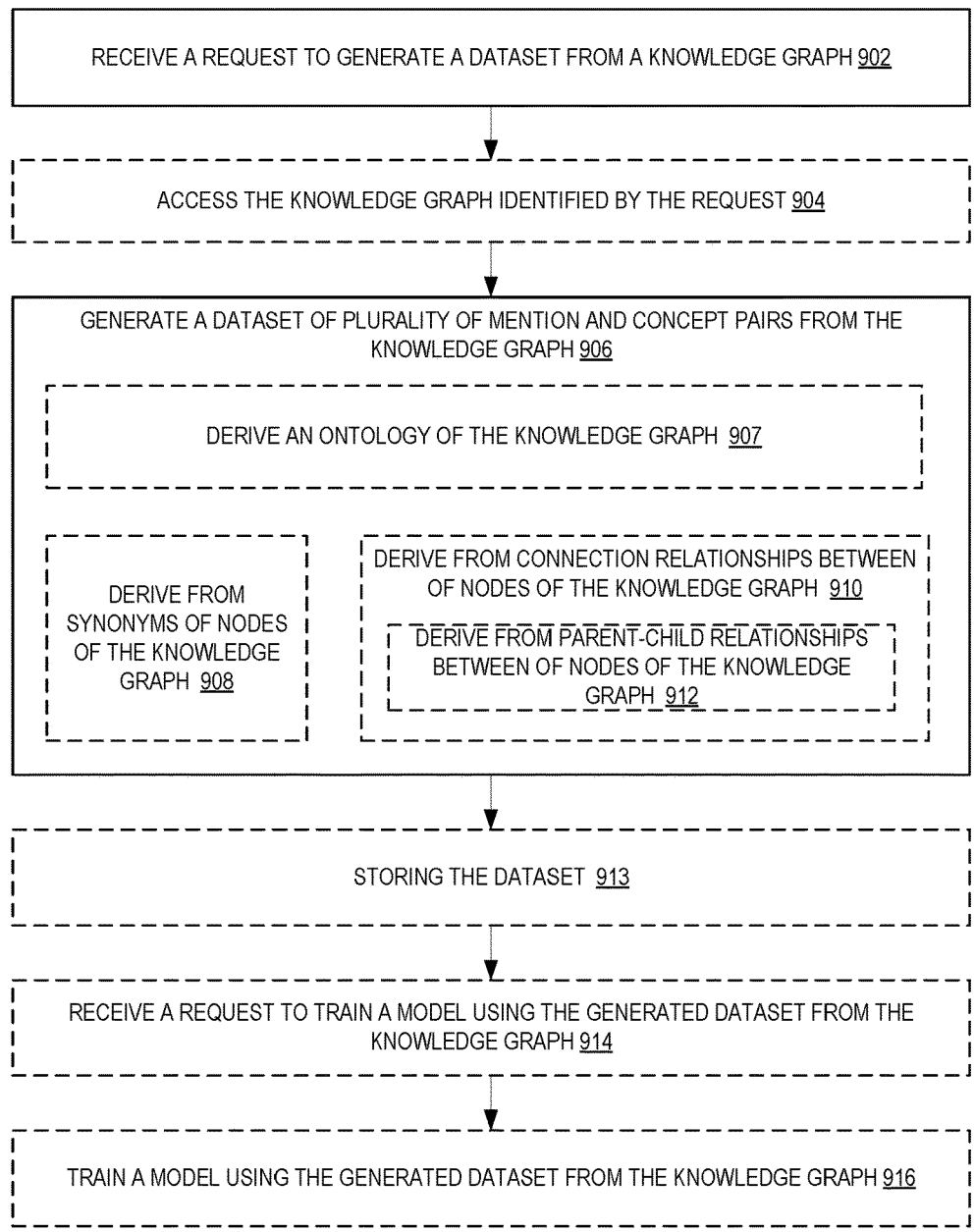
FIG. 9 is a flow diagram illustrating operations of a method for generating a dataset from a knowledge graph according to some embodiments.

FIG. 9 is a flow diagram illustrating operations of a method for generating a dataset from a knowledge graph according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the dataset generation service 820.

A request to generate a dataset from a knowledge graph is received at 902. In some embodiments, the request includes one or more of an indication of a location of a knowledge graph, a knowledge graph, an identifier of a type of derivation (synonym, connection relationship, parent-child relationship, etc.) to use in the generation of the dataset, an indication of location to store the dataset, an indication of how to allocate the dataset as either training or testing, an indication of an ontology of the KG, etc.

In some embodiments, the knowledge graph identified by the request is accessed at 904. For example, accessing a KG from a storage location of a provider network.

A plurality of mention and concept pairs are generated from the knowledge graph based on one or more of an ontology of the knowledge graph and an indication of type of derivation to use at 906.

In some embodiments, an ontology of the KG is derived at 907 if not otherwise specified. The ontology may include one or more of classes in the KG, relationship types, categories, and free text descriptions.

In some embodiments, the mention and concept pairs are derived from synonyms of nodes of the knowledge graph at 908. For example, a mention may be one of the synonyms of a node and a concept may be one or more of the other synonyms of the node. In some embodiments, each non-duplicative possible pair is generated as a mention-concept pair. In these embodiments, a mention-concept pair may be, for example, mention A and concept B, but there does not need to be a mention-concept pair of mention B and concept A.

In some embodiments, the mention and concept pairs are derived from connection relationships between of nodes of the knowledge graph at 910. Relationships are associations between two or more nodes or data within nodes. Relationships may be used to logically define the meaning of a node in a way that can be processed by software. In some embodiments, a first concept is a "mention" and a related (corresponding) concept is a "concept" when making a mention-concept pair. In some embodiments, each non-duplicative possible pair is generated as a mention-concept pair. In these embodiments, a mention-concept pair may be, for example, mention A and concept B, but there does not need to be a mention-concept pair of mention B and concept A. Note that a filter based on a type of relationship may be used and, in some embodiments, is provided by the request.

In some embodiments, the connection relationship is a parent-child relationship, and the mention and concept pairs are derived from parent-child relationships between of nodes of the knowledge graph at 912. In particular, the KG is arranged in parent-child form and mention may be a first aspect of a parent node and a concept may be the same first aspect of the child node. In some embodiments, each non-duplicative possible pair is generated as a mention-concept pair. In these embodiments, a mention-concept pair may be, for example, mention A and concept B, but there does not need to be a mention-concept pair of mention B and concept A.

In some embodiments, as part of the generation, labeled data is supplemented with the generated dataset.

In some embodiments, the generated dataset is stored at 913.

In some embodiments, a request to train a model using the generated dataset from a knowledge graph is received at 914. This request may include one or more of a dataset to be used for training (and/or testing), an indication of a location of a dataset to be used for training (and/or testing), an algorithm to train, an indication of a location of an algorithm to train, a model to retrain, an indication of a location of a model to retrain, an indication of how to split the dataset into training and testing data, etc.

A model is trained using the generated dataset from the knowledge graph at 916.

Figure 10:
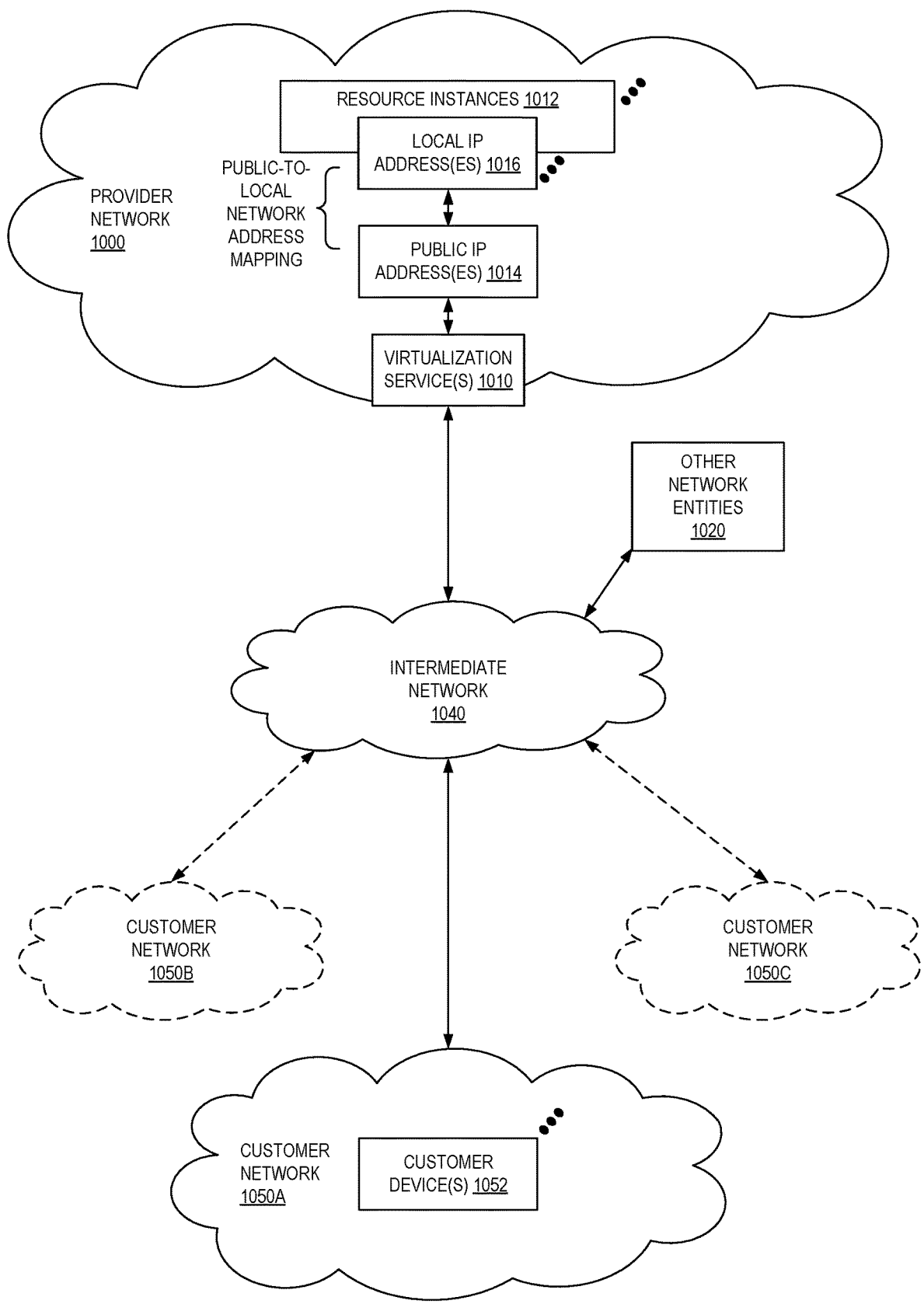
FIG. 10 illustrates an example provider network environment according to some embodiments.

FIG. 10 illustrates an example provider network (or "service provider system") environment according to some embodiments. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some embodiments, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
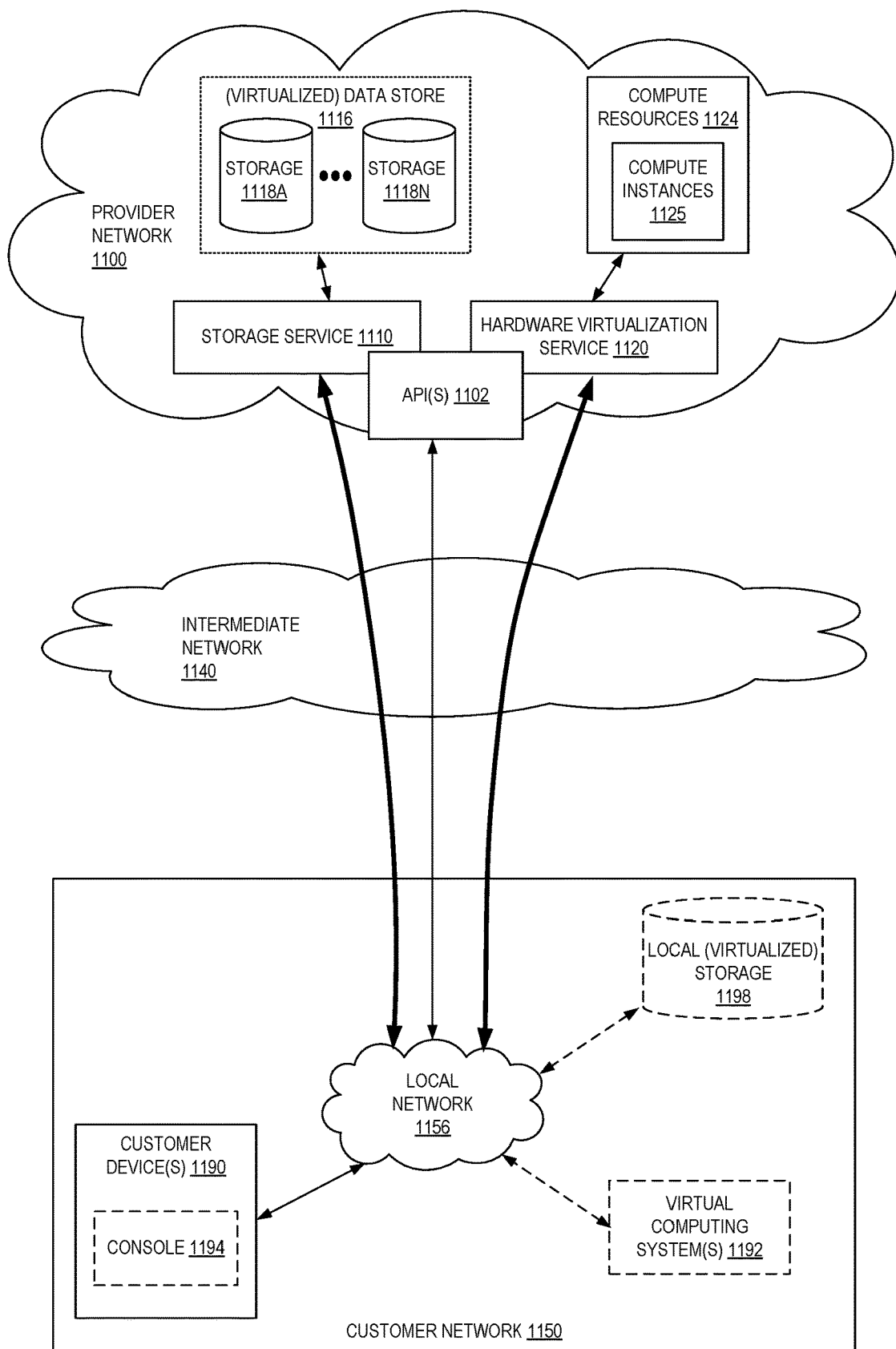
FIG. 11 is a block diagram of an example provider network that provides a storage service and a hardware virtualization service to customers according to some embodiments.

FIG. 11 is a block diagram of an example provider network environment that provides a storage service and a hardware virtualization service to customers, according to some embodiments. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some embodiments, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some embodiments, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some embodiments, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some embodiments, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
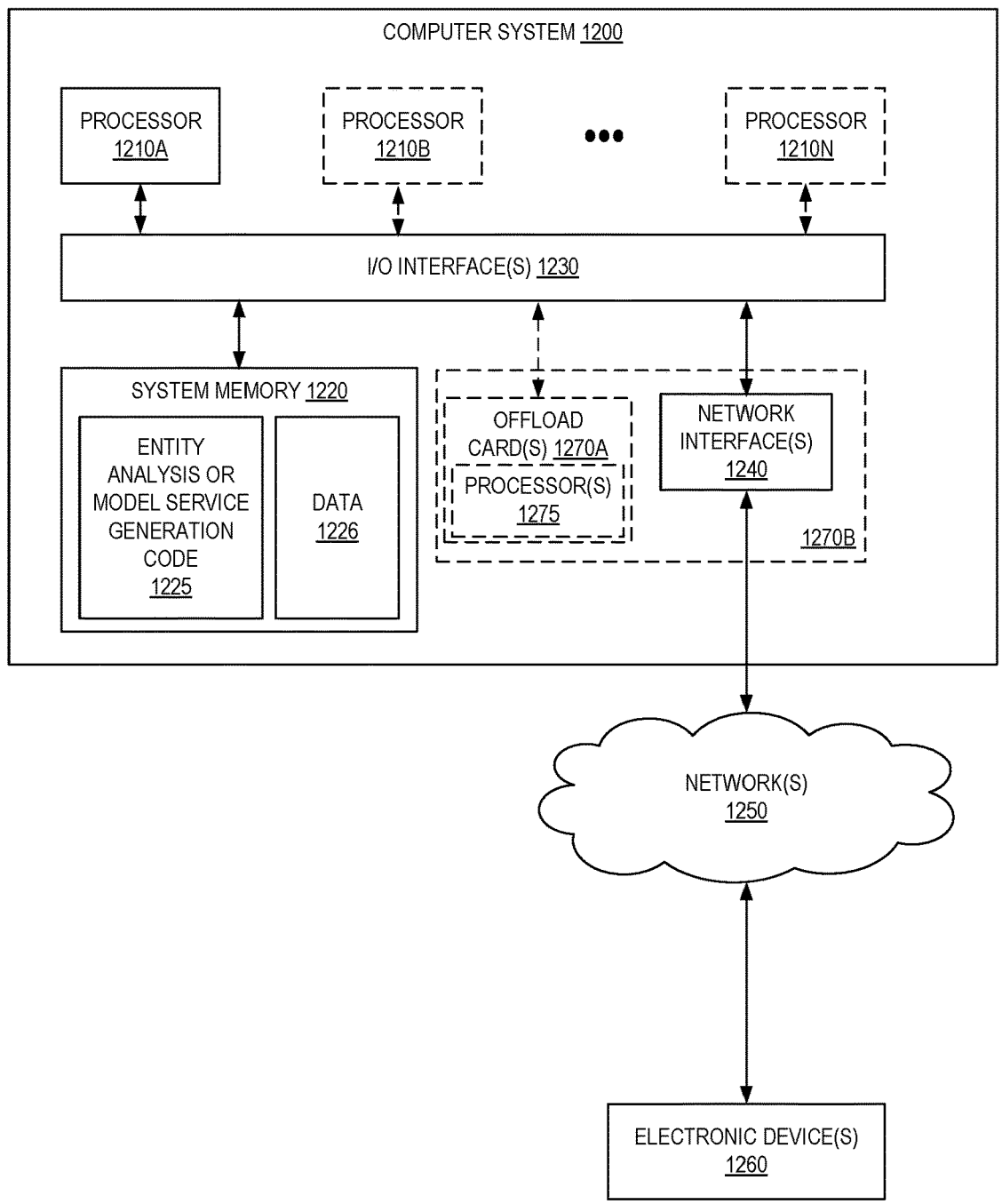
FIG. 12 is a block diagram illustrating an example computer system that can be used in some embodiments.

In some embodiments, a system that implements a portion or all of the techniques described herein can include a general-purpose computer system, such as the computer system 1200 illustrated in FIG. 12, that includes, or is configured to access, one or more computer-accessible media. In the illustrated embodiment, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various embodiments the computer system 1200 can include one computing device or any number of computing devices configured to work together as a single computer system 1200.

In various embodiments, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various embodiments, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various embodiments, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1220 as entity analysis service code and/or model generation service code 1225 (e.g., executable to implement, in whole or in part, the entity analysis service 112 and/or model generation service 814) and data 1226.

In some embodiments, the I/O interface 1230 can be configured to coordinate I/O traffic between the processor 1210, the system memory 1220, and any peripheral devices in the device, including the network interface 1240 and/or other peripheral interfaces (not shown). In some embodiments, the I/O interface 1230 can perform any necessary protocol, timing, or other data transformations to convert data signals from one component (e.g., the system memory 1220) into a format suitable for use by another component (e.g., the processor 1210). In some embodiments, the I/O interface 1230 can include support for devices attached through various types of peripheral buses, such as a variant of the Peripheral Component Interconnect (PCI) bus standard or the Universal Serial Bus (USB) standard, for example. In some embodiments, the function of the I/O interface 1230 can be split into two or more separate components, such as a north bridge and a south bridge, for example. Also, in some embodiments, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various embodiments, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect Express (PCI-E) standard, or another interconnect such as a QuickPath interconnect (QPI) or UltraPath interconnect (UPI)). For example, in some embodiments the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some embodiments the offload card(s) 1270A or 1270B can perform compute instance management operations, such as pausing and/or un-pausing compute instances, launching and/or terminating compute instances, performing memory transfer/copying operations, etc. These management operations can, in some embodiments, be performed by the offload card(s) 1270A or 1270B in coordination with a hypervisor (e.g., upon a request from a hypervisor) that is executed by the other processors 1210A-1210N of the computer system 1200. However, in some embodiments the virtualization manager implemented by the offload card(s) 1270A or 1270B can accommodate requests from other entities (e.g., from compute instances themselves), and cannot coordinate with (or service) any separate hypervisor.

In some embodiments, the system memory 1220 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
receiving, at a dataset generation service in a provider network, the dataset generation service executing dataset generation service code using one or more processors, a request to generate a dataset from a knowledge graph;
generating, by the dataset generation service, the dataset comprising mention-concept pairs from the knowledge graph according to the request by deriving the mention-concept pairs from parent-child relationships between nodes of the knowledge graph using a custom ontology for the knowledge graph;
training a machine learning model using the dataset; and
sending an alert to a requester of a completion of the training of the machine learning model.

2. The computer-implemented method of claim 1, wherein the request further comprises a request for training the machine learning model.

3. The computer-implemented method of claim 1, wherein the request includes one or more of an indication of a location of the knowledge graph, the knowledge graph, an identifier of a type of evaluation to use in the generation of the dataset, an indication of a location to store the dataset, an indication of how to allocate the dataset as either training or testing, and an indication of the custom ontology of the knowledge graph.

4. A computer-implemented method comprising:
receiving, at a dataset generation service in a provider network, the dataset generation service executing dataset generation code using one or more processors, a request to generate a dataset from a knowledge graph;
generating, by the dataset generation service, the dataset comprising mention-concept pairs from the knowledge graph according to the request by generating the mention-concept pairs for synonyms of a node of the knowledge graph using a custom ontology for the knowledge graph, including generating a mention as a synonym of the node and generating a corresponding concept as another synonym of the node;
training a machine learning model using the dataset; and
sending an alert to a requester of a completion of the training of the machine learning model.

5. The computer-implemented method of claim 4, wherein the request includes one or more of an indication of a location of the knowledge graph, the knowledge graph, an identifier of a type of evaluation to use in the generation of the dataset, an indication of a location to store the dataset, an indication of how to allocate the dataset as either training or testing, and an indication of the custom ontology of the knowledge graph.

6. The computer-implemented method of claim 4, further comprising accessing the knowledge graph from a storage location in the provider network.

7. The computer-implemented method of claim 4, further comprising adding the dataset to an existing dataset.

8. The computer-implemented method of claim 4, wherein generating the dataset further comprises generating each non-duplicative possible pair of synonyms of the node of the knowledge graph as a mention-concept pair.

9. The computer-implemented method of claim 4, wherein generating the dataset further comprises deriving the mention-concept pairs from connected relationships between nodes of the knowledge graph.

10. The computer-implemented method of claim 9, wherein the connected relationships are parent-child relationships.

11. The computer-implemented method of claim 4, further comprising receiving a request to train the machine learning model, the request to train including one or more of a training dataset, an indication of a location of the training dataset, an algorithm to train, an indication of a location of the algorithm to train, a model to retrain, an indication of a location of the model to retrain, or an indication of how to split the dataset into training data and testing data.

12. The computer-implemented method of claim 4, wherein the request further comprises a request for training the machine learning model.

13. A system comprising:
- a first one or more electronic devices to implement storage for knowledge graphs in a multi-tenant provider network; and
- a second one or more electronic devices to implement a dataset generation service in the multi-tenant provider network, the dataset generation service including dataset generation code that upon execution by one or more processors cause the dataset generation service to:
  - receive a request to generate a dataset from a knowledge graph;
  - generate the dataset comprising mention-concept pairs from the knowledge graph according to the request by generating the mention-concept pairs for synonyms of a node of the knowledge graph using a custom ontology for the knowledge graph, including generating a mention as a synonym of the node and generating a corresponding concept as another synonym of the node;
  - train a machine learning model using the dataset; and
  - send an alert to a requester of a completion of the training of the machine learning model.

14. The system of claim 13, wherein the request includes one or more of an indication of a location of the knowledge graph, the knowledge graph, an identifier of a type of evaluation to use in the generation of the dataset, an indication of a location to store the dataset, an indication of how to allocate the dataset as either training or testing, and an indication of the custom ontology of the knowledge graph.

15. The system of claim 13, wherein generating the dataset further comprises the generation service generating each non-duplicative possible pair of synonyms of the node of the knowledge graph as a mention-concept pair.

16. The system of claim 13, wherein the dataset generation service is further to add the dataset to an existing dataset.

17. The system of claim 13, wherein generating the dataset further comprises the generation service deriving the mention-concept pairs from connected relationships between nodes of the knowledge graph.

18. The system of claim 17, wherein the connected relationships are parent-child relationships.

19. The system of claim 13, wherein the dataset generation code includes further code that upon execution by the one or more processors further causes the dataset generation service to receive a request to train the machine learning model, the request to train including one or more of a training dataset, an indication of a location of the training dataset, an algorithm to train, an indication of a location of the algorithm to train, a model to retrain, an indication of a location of the model to retrain, or an indication of how to split the dataset into training data and testing data.

20. The system of claim 13, wherein the request further comprises a request for training the machine learning model.

* * * * *